UNITED STATES PATENT OFFICE.

MICHAEL FREY, JR., OF CHILLICOTHE, OHIO.

HOG-CHOLERA MEDICINE.

SPECIFICATION forming part of Letters Patent No. 300,460, dated June 17, 1884.

Application filed January 17, 1884. (No specimens.)

*To all whom it may concern:*

Be it known that I, MICHAEL FREY, Jr., a citizen of the United States, residing at Chillicothe, in the county of Ross and State of Ohio, have invented a new and useful composition of matter to be used for the prevention and treatment of hog cholera, of which the following is a specification.

My composition consists of the following ingredients, combined in the proportions stated, viz: slaked lime, ten pounds; copperas, four and one-fourth pounds; salt, five ounces; pulverized tobacco, five ounces. These ingredients are to be thoroughly mixed together.

In using the above-named composition in order to prevent the cholera it should be fed to hogs at least once a month in the proportion of two pounds of the composition mixed with one bushel of shelled corn, or two pounds of the composition to a barrel of slop of two and one-half bushels, to be thoroughly stirred with the slop before feeding. To effect a cure of cholera it should be fed to hogs so diseased in the same proportion, but every day for at least five days, or as long as the disease continues. It may also be fed without mixing it with food other than slack coal, with which it can be mixed in the proportion of five pounds of slack coal to ten pounds of the composition, which the hogs will eat when fed to them.

By the use of the above composition, by feeding it monthly, as above stated, it will prevent hogs from taking the cholera, and keep them in a sound, healthy condition; and by using the said composition among hogs already affected with cholera, by feeding as above stated, it proves an effective treatment for said disease.

I am aware that a composition consisting of lime, salt, and copperas has been used for the same purpose; but I am not aware that all the ingredients of my composition in the proportions stated have been used together.

What I claim, and desire to secure by Letters Patent of the United States, is—

The herein-described composition of matter to be used for preventing and treatment of hog cholera, consisting of slaked lime, copperas, salt, and pulverized tobacco, in the proportions specified.

MICHAEL FREY, JR.

Witnesses:
V. BRUNNER,
CHAS. F. LUMMIS.